United States Patent
Nanaumi et al.

(10) Patent No.: US 6,820,925 B2
(45) Date of Patent: Nov. 23, 2004

(54) PARTITION FOR USE IN VEHICLES

(75) Inventors: Kyosuke Nanaumi, Tochigi-ken (JP);
Koichi Kaiyama, Utsunomiya (JP);
Minoru Ido, Utsunomiya (JP); Kazuya Inoue, Kariya (JP)

(73) Assignees: Keihin Corporation, Tokyo (JP);
Denso Corporation, Kariya (JP)

( * ) Notice: Subject to any disclaimer, the term of this patent is extended or adjusted under 35 U.S.C. 154(b) by 0 days.

(21) Appl. No.: 10/462,619

(22) Filed: Jun. 17, 2003

(65) Prior Publication Data

US 2003/0232591 A1 Dec. 18, 2003

(30) Foreign Application Priority Data

Jun. 18, 2002 (JP) ........................................ 2002-177171

(51) Int. Cl.7 ................................................ B60J 7/00
(52) U.S. Cl. ........................... 296/187.05; 296/187.03; 296/70
(58) Field of Search ........................... 296/187.05, 24.1, 296/70, 146.7, 187.03, 189, 203.021, 187.07, 24.4, 24.42, 24.43; 49/501, 413; 293/132; 439/65; 280/743.1, 729, 730.2, 741, 728.3, 735, 252; 188/374; 180/90; 342/70; 340/435, 436

(56) References Cited

U.S. PATENT DOCUMENTS

| | | | | |
|---|---|---|---|---|
| 4,155,200 A | * | 5/1979 | Emanuel | 49/501 |
| 4,460,206 A | * | 7/1984 | Peter | 293/132 |
| 4,919,477 A | * | 4/1990 | Bingham et al. | 296/24.1 |
| 5,002,493 A | * | 3/1991 | Brown et al. | 439/65 |
| 5,273,310 A | * | 12/1993 | Terai | 296/70 |
| 5,433,478 A | * | 7/1995 | Naruse | 296/146.7 |
| 5,551,673 A | * | 9/1996 | Furusawa et al. | 267/160 |
| 5,593,182 A | * | 1/1997 | Frost | 296/187.05 |
| 5,709,407 A | * | 1/1998 | Stephens et al. | 296/187.05 |
| 5,857,702 A | * | 1/1999 | Suga et al. | 296/187.05 |
| 5,868,458 A | * | 2/1999 | Hirata et al. | 296/187.05 |
| 5,924,764 A | * | 7/1999 | Eipper et al. | 296/187.05 |
| 5,938,273 A | * | 8/1999 | Williams et al. | 296/187.05 |
| 6,145,908 A | * | 11/2000 | Deb et al. | 296/187.05 |
| 6,203,056 B1 | * | 3/2001 | Labrie et al. | 280/728.3 |
| 6,231,116 B1 | * | 5/2001 | Naert et al. | 296/70 |
| 6,390,538 B1 | * | 5/2002 | Hashimoto et al. | 296/187.05 |
| 6,443,513 B1 | * | 9/2002 | Glance | 296/187.05 |
| 6,467,835 B1 | * | 10/2002 | Beckmann | 296/187.05 |
| 6,474,721 B2 | * | 11/2002 | Nishikawa et al. | 296/187.05 |
| 6,591,552 B1 | * | 7/2003 | Rasmussen | 49/413 |
| 6,659,535 B2 | * | 12/2003 | Dohrmann | 296/187.03 |
| 2002/0070584 A1 | * | 6/2002 | Carroll et al. | 296/189 |

FOREIGN PATENT DOCUMENTS

JP   10-58951 A   3/1998

* cited by examiner

*Primary Examiner*—Kiran Patel
(74) *Attorney, Agent, or Firm*—Birch, Stewart, Kolasch & Birch, LLP

(57) ABSTRACT

A surface, which receives shocks when hit by a radio unit upon a vehicle collision, has grooves defined in a peripheral region thereof. The surface also has a protrusion in a region, which can possibly be hit by the radio unit. Upon a vehicle collision, a rear surface of the radio unit initially impinges upon the protrusion. Stresses are concentrated on the protrusion, developing a crack in a groove near the protrusion. Once the crack is developed, it easily spreads along the groove.

11 Claims, 7 Drawing Sheets

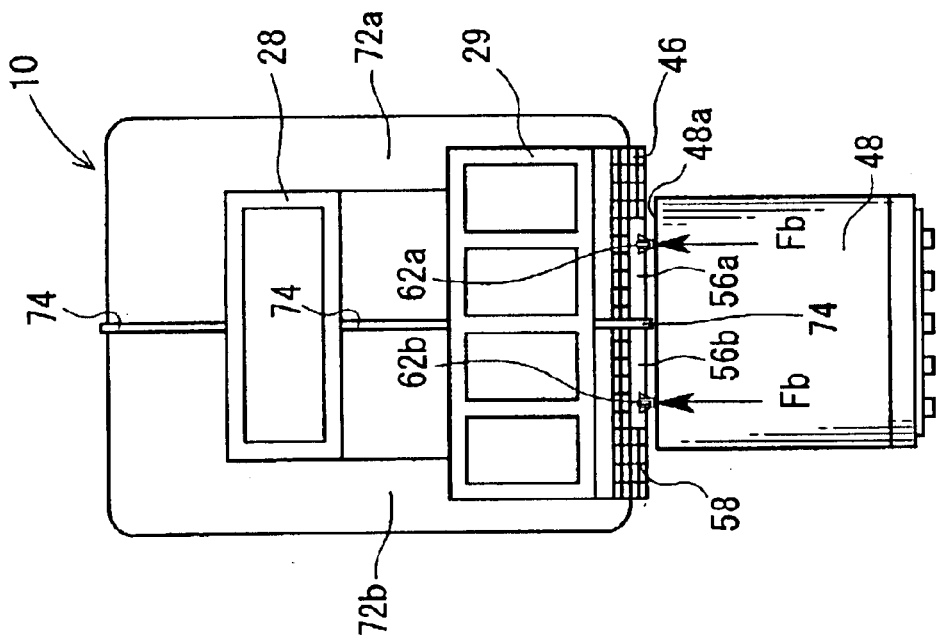
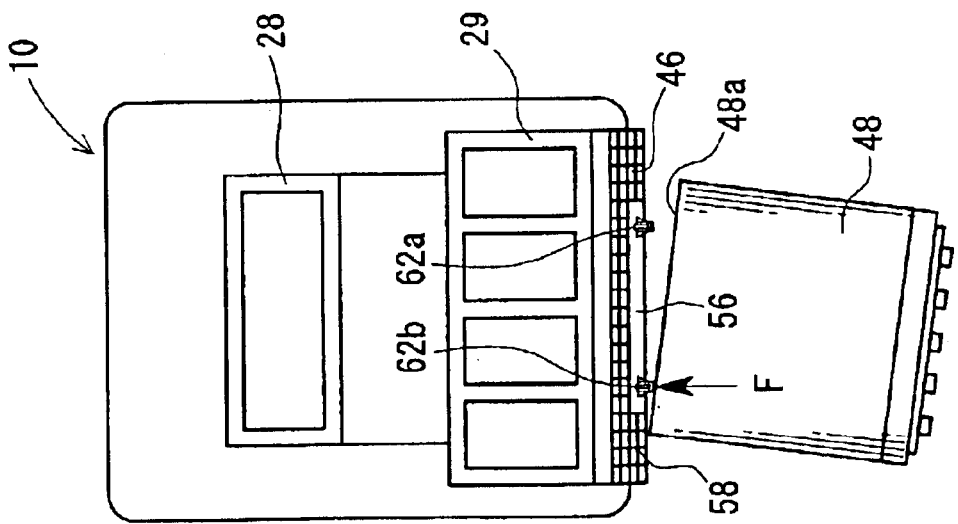

PARTITION FOR USE IN VEHICLES

This nonprovisional application claims priority under 35 U.S.C. §119(a) on Patent Application No(s). 2002-177171 filed in JAPAN on Jun. 18, 2002, which is(are) herein incorporated by reference.

BACKGROUND OF THE INVENTION

1. Field of the Invention

The present invention relates to a vehicle partition which can easily be broken to dampen shocks applied upon a collision of the vehicle.

2. Description of the Related Art

In recent years, greater importance has been put on providing protection for passengers in a vehicle. For example, in times of a vehicle collision, airbags for preventing passengers from hitting the front console or steering wheel are widely used.

Parts of the front console not protected by airbags, or front consoles in vehicles not equipped with airbags, are required to have a structure that will not give an impact to the passengers even if they hit the front console. Specifically, a device disposed in a front console should have low mechanical strength so that it will break upon a collision to absorb shocks which would otherwise be transmitted through the device.

Normally, a radio unit (or a car navigation system or the like) is installed approximately centrally in the front console and a vehicle air-conditioning system is positioned behind the radio unit. It is difficult to reduce the mechanical strength of the radio unit, so that the radio unit can easily be broken upon impact, and the radio unit may be replaced with another device by the user. In order for the radio unit not to apply shocks to the passenger when the passenger hits the radio unit, the vehicle air-conditioning system positioned behind the radio unit needs to have an easily breakable partition. When the passenger hits the radio unit, the impact is transmitted via the radio unit to the air-conditioning system, breaking the partition thereof to reduce the shock applied to the passenger.

It has been proposed to make the partition of a vehicle air-conditioning system easily breakable in a region which may hit the radio unit upon a vehicle collision, by forming a thin-walled groove near the region of the partition (see Japanese laid-open patent publication No. 10-58951, for example). According to the proposed structure, a concentric groove is formed around the region of the partition that is expected to be hit by the radio unit, and the partition is broken along the groove when the vehicle collides. As a result, the partition operates as a shock absorbing member to reduce the shock which may be applied to the passenger.

If the groove formed around the region of the partition that is expected to be hit by the radio unit is deep, the partition can be broken easily therefore reducing the shock which may be applied to the passenger. However, the deep groove makes the casing of the air-conditioning system low in mechanical strength. Since the partition of the vehicle air-conditioning system should preferably be mechanically strong enough for vibration resistance, the partition is required to have a strength enough to withstand vibrations while the vehicle is running, and a weakness enough to break upon a vehicle collision.

SUMMARY OF THE INVENTION

It is a general object of the present invention to provide a partition in vehicles, which is strong enough to withstand vibrations while the vehicle is running, but easily breakable upon a vehicle collision to absorb shocks which may be applied to the passenger.

A major object of the present invention is to provide a partition in vehicles, which can reliably be broken to absorb shocks.

Another object of the present invention is to provide a partition in vehicles, which can easily be manufactured.

According to the present invention, there is provided a partition for use in a vehicle, a collision surface for receiving shocks when a peripheral member impinges thereon and the backside of the collision surface being a space, a thin-walled region surrounding the collision surface, and a protrusion disposed on the collision surface in a region which can possibly be hit by the peripheral member.

When a vehicle collides with an obstacle and the peripheral member is displaced toward the partition, the peripheral member initially hits the protrusion. Stresses are concentrated on the protrusion, developing a crack in an area of the thin-wall region, which is close to the protrusion. Since the crack is developed under stress concentration, the thin-walled region does not need to be very thin. Once the crack is produced, it easily spreads along the thin-walled region, breaking the partition. The partition is sufficiently mechanically strong while the vehicle is running, but can easily be broken upon a vehicle collision for absorbing shocks. When a passenger of the vehicle hits the partition through the peripheral member, shocks applied to the passenger are absorbed or reduced by the broken partition.

The partition may further comprise a support contacting a side surface of the protrusion and the collision surface. The support is effective to prevent the protrusion from being broken, and, as a result, effective to cause the thin-walled region to crack easily.

The protrusion may have a tubular shape. The tubular protrusion has a relatively small wall thickness, and any thermal strains caused immediately after the protrusion has been molded of synthetic resin are minimized.

The thin-walled region may comprise a plurality of intersecting grooves. The grooves allow the thin-walled region to crack vertically and horizontally upon a vehicle collision, making the partition easily breakable.

The grooves may be deeper in an area close to the protrusion than in other areas. The deeper grooves are easier to crack when the vehicle collides.

If a plurality of protrusions is disposed on the collision surface, then the peripheral member can easily hit one of the protrusions even when the peripheral member is displaced obliquely toward the collision surface, so that the collision surface can easily be broken.

The peripheral member may be an engine, and the thin-walled region and the protrusion may be positioned near the engine.

The collision surface may be a wall having an air passage in a vehicle air-conditioning system. The vehicle air-conditioning system with the collision surface can absorb shocks from a vehicle collision.

The collision surface may have a seam and be divided by the seam into a pair of collision surfaces, each of the collision surfaces having the protrusion. Both the collision surfaces on the opposite sides of the seam can be broken.

The protrusion may have a greater height from the collision surface than the seam.

If the protrusion has a flat upper surface, then, when the peripheral member hits the flat upper surface, the peripheral member reliably presses the protrusion.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5A is a plan view showing the manner in which a radio unit collides obliquely with a vehicle air-conditioning system; and FIG. 5B is a plan view showing the manner in which a radio unit collides with a vehicle air-conditioning system having two left and right components of synthetic resin;

DESCRIPTION OF THE PREFERRED EMBODIMENTS

A partition in a vehicle according to the present invention will be described below with reference to FIGS. 1 through 5B.

Figure 1:
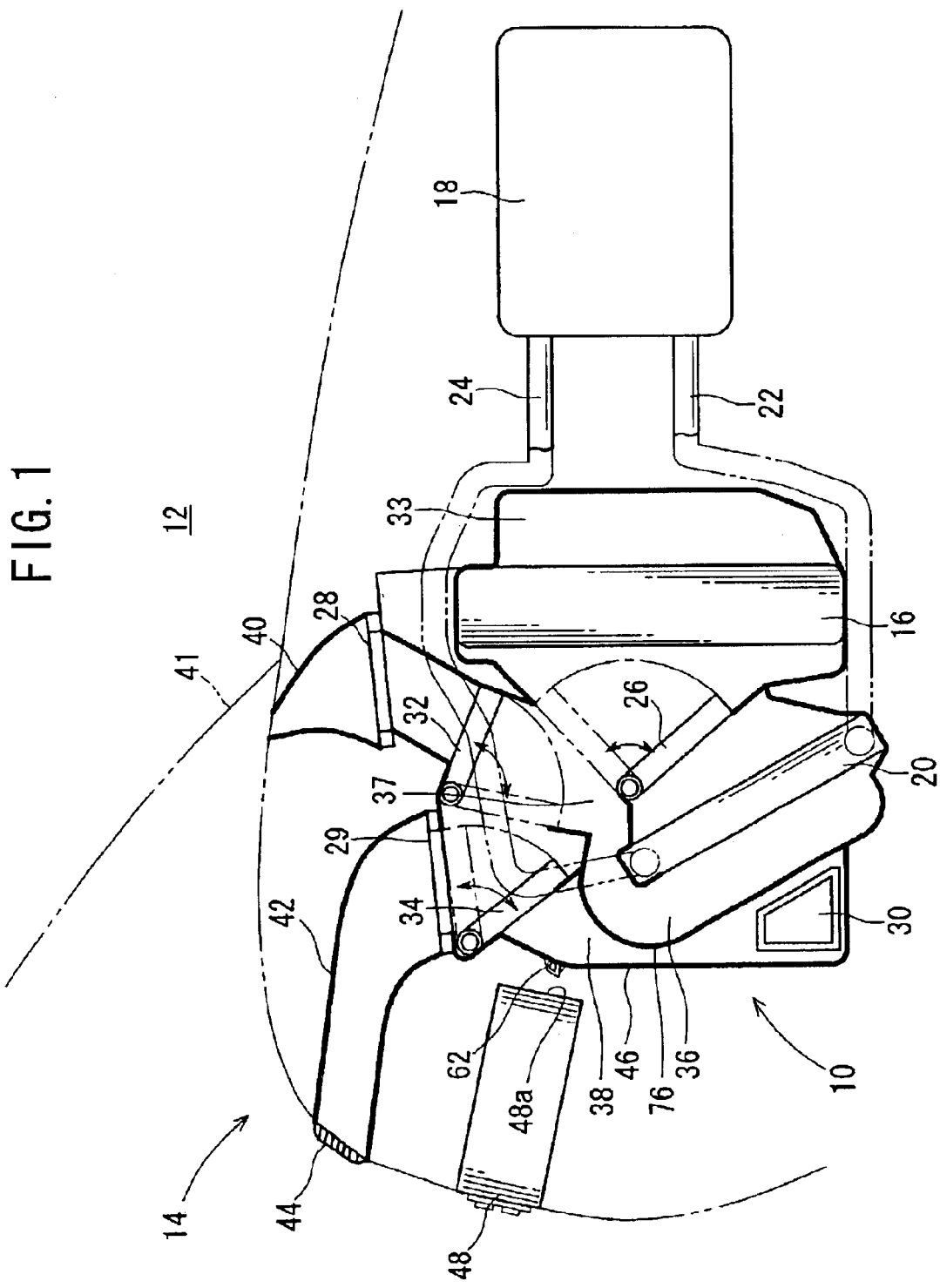
FIG. 1 is a vertical cross-sectional view of a vehicle air-conditioning system and peripheral parts according to the present invention.

As shown in FIG. 1, a vehicle air-conditioning system 10, which incorporates the partition according to the present invention, serves to adjust the temperature and humidity of air in a passenger's compartment of a vehicle 12, and is disposed within a front console 14 of the vehicle 12. The vehicle air-conditioning system 10 has a blower fan (not shown) for selecting and supplying internal air or external air, an evaporator 16 for cooling and dehumidifying air supplied from the blower fan by evaporating a refrigerant, a heater core 20 for heating air through a heat exchange by cooling water from an engine 18, an inlet pipe 22 for introducing hot water from the engine 18 into the heater core 20, and an outlet pipe 24 for delivering hot water, which has heated air, from the heater core 20 to the engine 18. The inlet pipe 22 extends below the evaporator 16 and is connected to the engine 18. The outlet pipe 24 extends over the evaporator 16 and is connected to the engine 18. The hot water means cooling water heated by the waste heat generated by the engine 18.

The vehicle air-conditioning system 10 also has a compressor, a condenser, and an expansion valve (not shown). The refrigerant, which is evaporated by the evaporator 16, is compressed by the compressor and then liquefied by the condenser. The liquefied refrigerant is converted by the expansion valve into a mist, which returns to the evaporator 16 for circulation.

The vehicle air-conditioning system 10 also has an air mixing door 26 for adjusting the amount of air that has passed through the evaporator 16 and which is to be introduced into the heater core 20, and two selector doors 32, 34 for selecting three air outlets, i.e., a defroster outlet 28, a face outlet 29, and a foot outlet 30, by changing air passages.

Air supplied from the blower fan is introduced into a space 33 in front of the evaporator 16, flows through the evaporator 16, and the direction of the flow is controlled by the air mixing door 26. Part or all of the air is introduced into the heater core 20 by the air mixing door 26 depending on its opening. When the air mixing door 26 is fully closed, the air is blocked from entering into the heater core 20.

When the air mixing door 26 is fully opened, all of the air that has passed through the evaporator 16 is introduced into the heater core 20. After having passed through the heater core 20, the air flows upwardly through a first air passage 36 into a space 37 at an outlet of the first air passage 36. When the air mixing door 26 is fully closed, the air that has passed through the evaporator 16 is not supplied to the heater core 20, but directly supplied to the space 37. From the space 37, the air is delivered into the passenger's compartment from the defroster outlet 28 and/or the face outlet 29 by the selector doors 32, 34 depending on their opening. Also, depending on the opening of the selector doors 32, 34, part of or all of the air is introduced into a second air passage (space) 38, from which the air is delivered into the passenger's compartment through the foot outlet 30. Specifically, the air introduced into the defroster outlet 28 is delivered through a duct 40 toward a front windshield 41. The air introduced into the face outlet 29 is delivered through a duct 42 and a ventilation grill 44 into the passenger's compartment. The air introduced into the foot outlet 30 is delivered through a duct (not shown) toward the feet of the passenger.

The second air passage 38 of the vehicle air-conditioning system 10 is partly defined by a partition comprising a resin panel 46. A radio unit (another component) 48 mounted on the front console 14 is positioned near the resin panel 46. The resin panel 46 is molded of polypropylene, for example.

Figure 2:
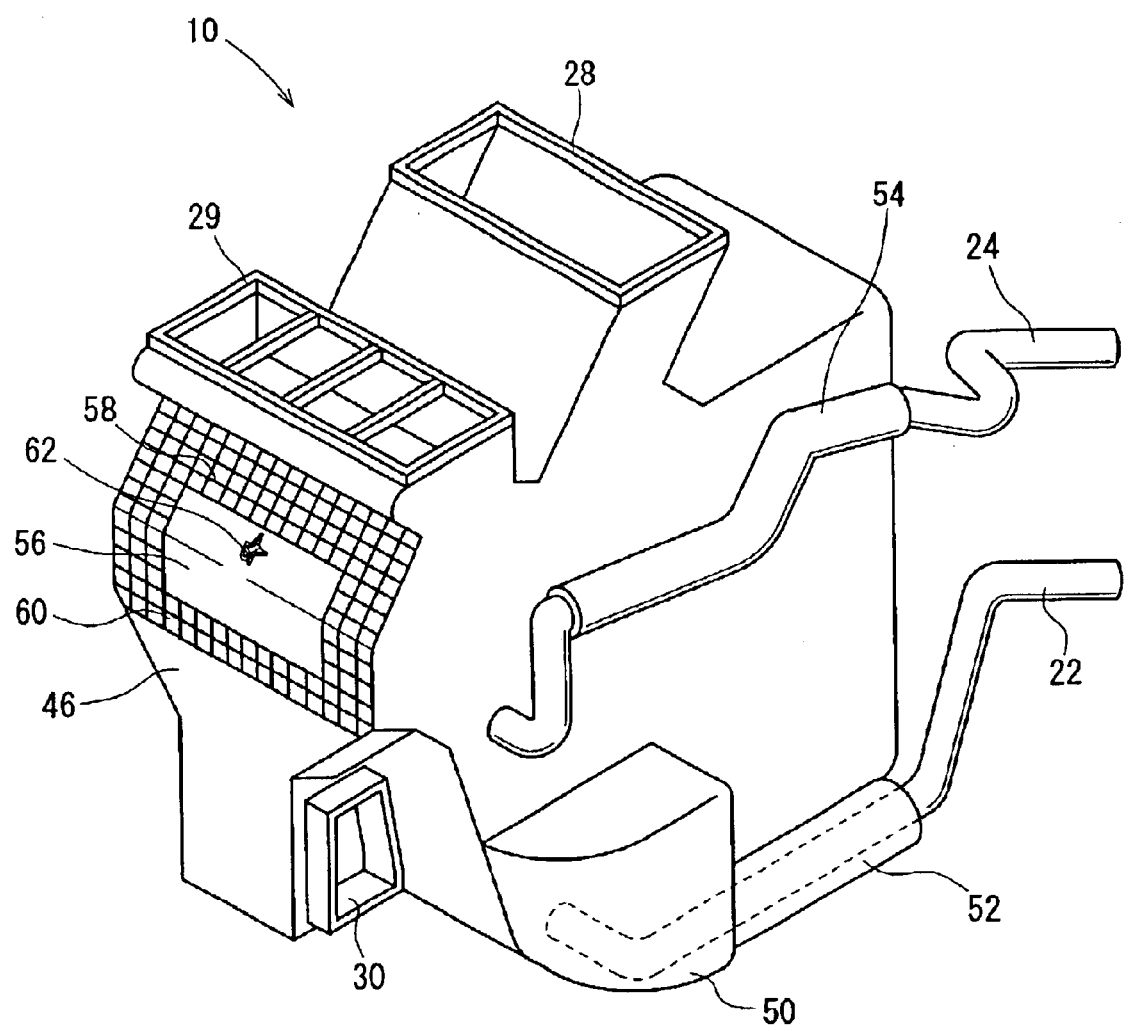
FIG. 2 is a perspective view of the vehicle air-conditioning system.

As shown in FIG. 2, the inlet pipe 22 is covered partly with a first protective cover 50 and a second protective cover 52. The outlet pipe 24 is covered partly with an insulation member 54. The first protective cover 50, the second protective cover 52, and the insulation member 54 serve to prevent persons (passengers or maintenance personnel) from directly touching the inlet pipe 22 and the outlet pipe 24 inadvertently.

The resin panel 46 has a grid-like pattern of vertical and horizontal grooves 58 defined in a peripheral region of its surface (collision surface) 56 close to the radio unit 48 (see FIG. 1). The resin panel 46 has a sufficient thickness in the grooves 58 for providing desired mechanical strength to the resin panel 46 for resistance against vibrations and fatigue while the vehicle is running normally.

The resin panel 46 also has a plurality of blocks 60 surrounded by the grooves 58 in the grid-like pattern. The surface 56 of the resin panel 46 has a protrusion 62 disposed substantially centrally thereon to the radio unit 48. The protrusion 62 projects toward the radio unit 48. When the vehicle 12 collides with another vehicle or object, the area of the resin panel 46 where the protrusion 62 is positioned is assumed to initially hit the radio unit 48.

Figure 3:
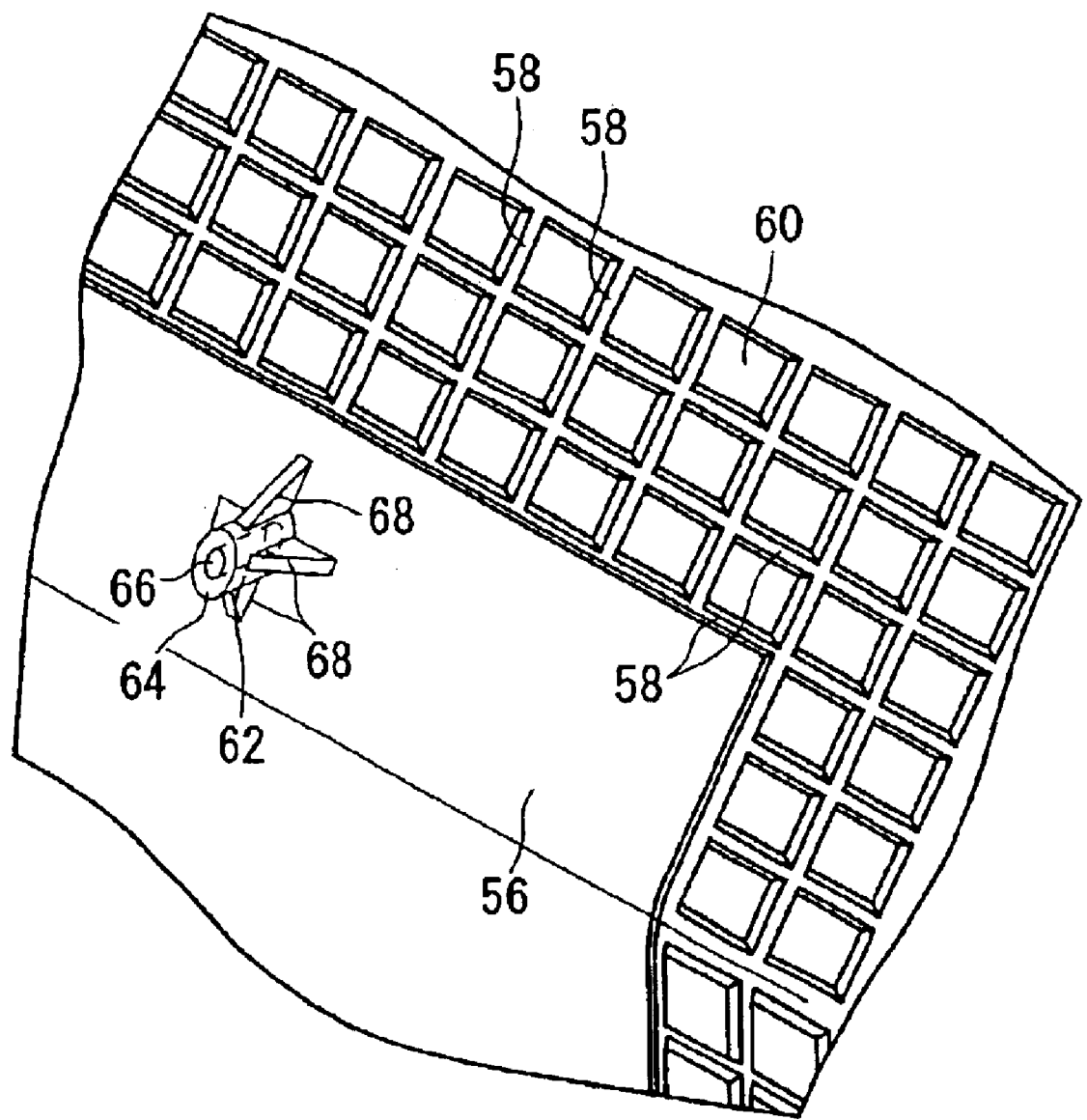
FIG. 3 is an enlarged fragmentary perspective view of a protrusion and peripheral parts on a casing of the vehicle air-conditioning system.

As shown in FIG. 3, the protrusion 62 is in the form of a tubular pin having a round hole 66 with its opening in a flat upper surface 64. The round hole 66 may alternatively have its opening in it's the lower surface facing the second air passage 38 (see FIG. 1). The side surface of the protrusion 62 is joined to the surface 56 by four triangular ribs (supports) 68 which are angularly spaced at 90° intervals around the protrusion 62.

Since the protrusion 62 has the round hole 66 defined therein, its wall thickness is relatively small. Therefore, any thermal strains caused in the protrusion 62 immediately after molding are minimized. Because the upper surface 64 of the protrusion 62 is flat, the radio unit 48 will reliably press the upper surface 64 when the ratio unit 48 impinges upon the protrusion 62. The protrusion 62, which is supported by the triangular ribs 68, is prevented from being broken when pressed by the radio unit 48, and hence, can reliably transmit forces from the radio unit 48 to the surface 56.

An action of the vehicle air-conditioning system 10 absorbing impact forces when the vehicle 12 collides with another vehicle or object will be described below with reference to FIGS. 4, 5A, 5B and 7.

When the vehicle 12, while running, collides with another vehicle or object in front of the vehicle 12, passengers in the vehicle 12, which is facing the front console 14, may possibly hit the radio unit 48 that is disposed substantially centrally on the front console 14. Passengers seated on left and right front seats of the vehicle 12 are less likely to hit the central radio unit 48, but a passenger seated centrally on a front or rear bench seat in the vehicle 12 is likely to hit the central radio unit 48 if the passenger has forgotten to fasten the seatbelt.

Figure 4:
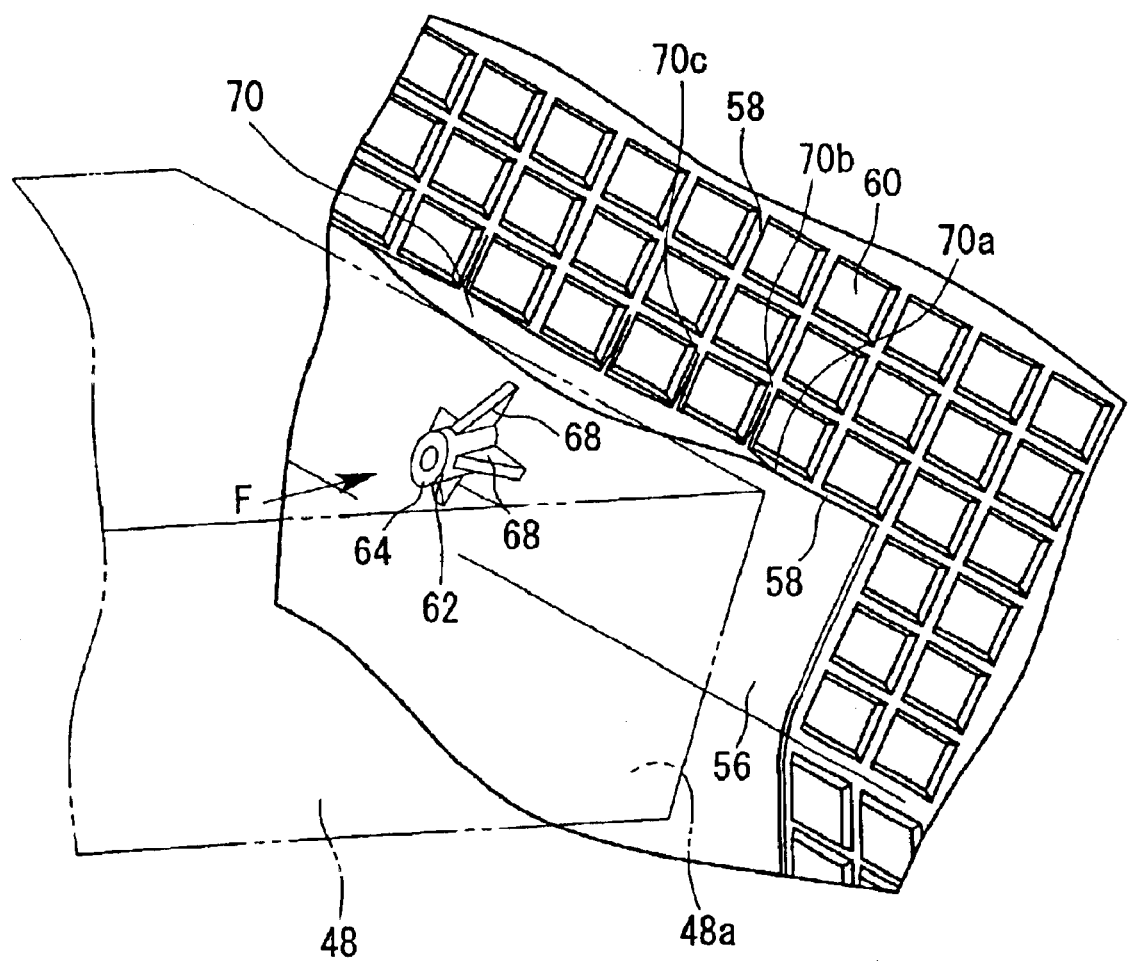
FIG. 4 is an enlarged fragmentary perspective view showing the manner in which a radio unit collides with the protrusion on the casing of the vehicle air-conditioning system.

When the passenger hits the radio unit 48, the radio unit 48 is pushed toward the front of the vehicle 12, and has its rear surface 48a of the radio unit 48 pressed against the protrusion 62 of the vehicle air-conditioning system 10. As shown in FIG. 4, the rear surface 48a pushes the upper surface 64 of the protrusion 62 under an impact load F. At this time, since the upper surface 64 is flat, the impact load F is reliably transmitted to the protrusion 62. The triangular ribs 68 joined to the protrusion 62 near the lower end prevent the protrusion 62 from being broken and allow the impact load F to be reliably transmitted to the surface 56.

Inasmuch as the impact load F is transmitted only to the protrusion 62, stresses are concentrated on the protrusion 62, causing a groove 58 near the protrusion 62 to develop a crack 70. Specifically, while the resin panel 46 is sufficiently thick in the grooves 58 for resistance against vibrations and fatigue while the vehicle is running normally, the crack 70 can easily be developed in a groove 58 near the protrusion 62 under the stress concentration.

Thereafter, the radio unit 48 is pushed into the second air passage 38 (see FIG. 1) under the impact load F, causing the crack 70 to spread along the groove 58. Specifically, once the crack 70 is produced, shear stresses are subsequently concentrated on ends 70a, 70b, 70c of the crack 70, and widening the crack 70 easily . Since the grooves 58 are arranged in a grid-like pattern, the crack 70 is developed vertically and horizontally along the grooves 58.

While the crack 70 is progressively spreading, shocks that the passenger receives through the radio unit 48 are weak because of the spreading crack 70. Accordingly, the impact that is applied to the passenger through the radio unit 48 is reduced.

If it were not for the protrusion 62, then when the vehicle 12 suffers a collision, the rear surface 48a of the radio unit 48 would directly contact the surface 56 of the resin panel 46, so that stresses would be less liable to be concentrated on the surface 56. In this case, in order to allow the resin panel 46 to be easily broken upon a vehicle collision, the grooves 58 would need to be deeper, making the resin panel 46 less mechanically strong during the normal travel of the vehicle 12.

If the radio unit 48 contacts the resin panel 46 at a plurality of regions, then the resin panel 46 may have a plurality of protrusions 62. For example, as shown in FIG. 5A, two protrusions 62a, 62b may be provided on the surface 56 at laterally spaced locations. According to this modification, even when the radio unit 48 is moved obliquely toward the resin panel 46, one of the protrusions 62a, 62b first impinges upon the rear surface 48a of the radio unit 48. Therefore, stresses are concentrated on the resin panel 46 under the impact load, causing the resin panel 46 to be easily broken.

FIG. 5B shows a vehicle air-conditioning system 10 having a casing made up of left and right components 72a, 72b of synthetic resin which are joined by a seam 74, but separable from each other. The radio unit 48 can impinge upon left and right surfaces 56a, 56b of the left and right components 72a, 72b. If the seam 74 between the left and right components 72a, 72b is relatively thick, then a crack 70 (see FIG. 4), which has started to spread under the impact force, may possibly be stopped by the seam 74.

If the seam 74 is relatively thick, then the left and right surfaces 56a, 56b may have respective protrusions 62a, 62b which are of a height greater from the left and right surfaces 56a, 56b than the seam 74 (see FIG. 5B). Upon a vehicle collision, the rear surface 48a of the radio unit 48 impinges upon the protrusion 62a and/or the protrusion 62b, and the surface 56a is broken under stresses concentrated on the protrusion 62a, and the surface 56b is broken under stresses concentrated on the protrusion 62b. After the surface 56a and/or the surface 56b is broken, stresses are also concentrated on the seam 74, thereby breaking the seam 74. Therefore, the resin panel 46 is sufficiently broken, absorbing shocks under the impact load.

The impact load, which is applied to the vehicle air-conditioning system 10, is divided into two impact loads Fa, Fb. Therefore, stresses applied to break the resin panel 46 are also divided into stresses applied to two areas and hence reduced in intensity. However, the divided stresses are strong enough to break the resin panel 46 sufficiently. If the seam 74 is relatively thin, then only one protrusion 62 may be provided on the resin panel 46.

In the illustrated embodiments, the grooves 58 are defined in the surface of the resin panel 46 which faces the radio unit 48. However, the grooves 58 may be defined in a rear surface of the resin panel 46, which faces away from the radio unit 48. The grooves 58 and the protrusion 62 may be provided on a dividing panel 76 (see FIG. 1) by which the first air passage 36 and the second air passage 38 are divided from each other. With this arrangement, since the radio unit 48 can break the dividing panel 76 after it has broken the resin panel 46, more shocks can be absorbed.

Figure 6:
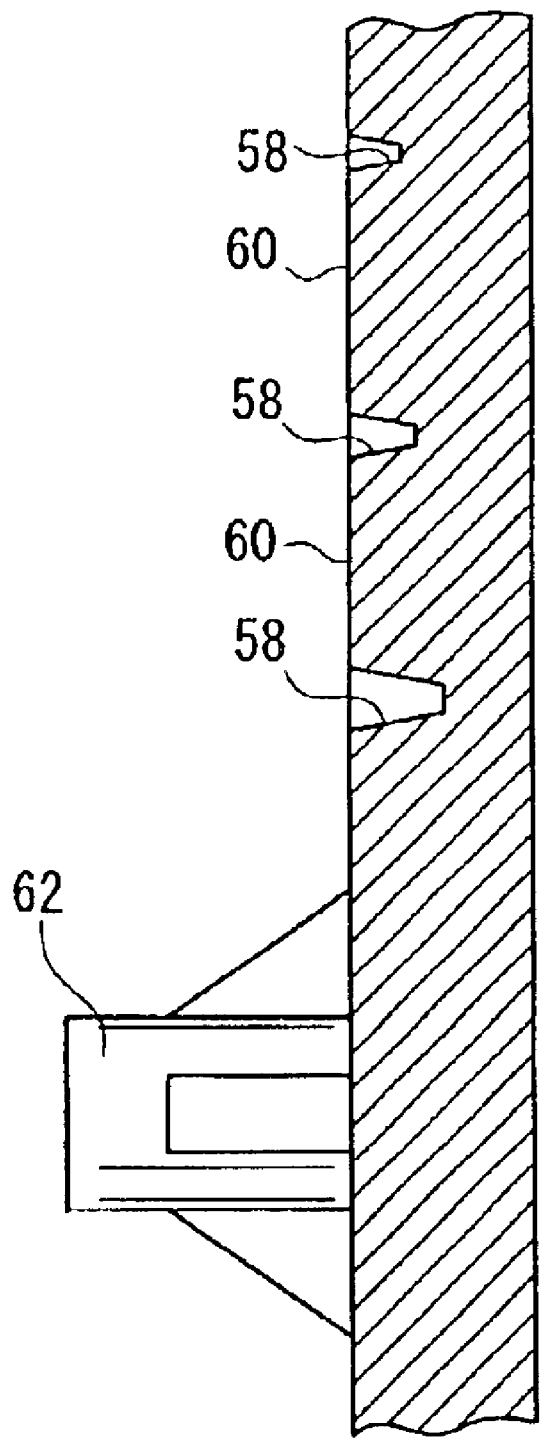
FIG. 6 is an enlarged fragmentary cross-sectional view of a vehicle partition.

The grooves 58 are not required to be of a uniform depth, but may be deeper in an area near the protrusion 62 than in other areas (see FIG. 6). The deeper grooves 58 near the protrusion 62 allow a crack 70 to be developed more easily in those grooves 58 when the radio unit 48 impinges upon the protrusion 62. Once the crack 70 is produced, it tends to spread easily under stresses concentrated on ends 70a, 70b, 70c (see FIG. 4). Therefore, the grooves 58 may be shallower in areas remote from the protrusion 62.

The protrusion 62 may not be integrally molded with the resin panel 46, but may be fastened by screws or an adhesive. The protrusion 62, which is fastened by screws or an adhesive, can freely be positioned in alignment with the radio unit 48.

Figure 7:
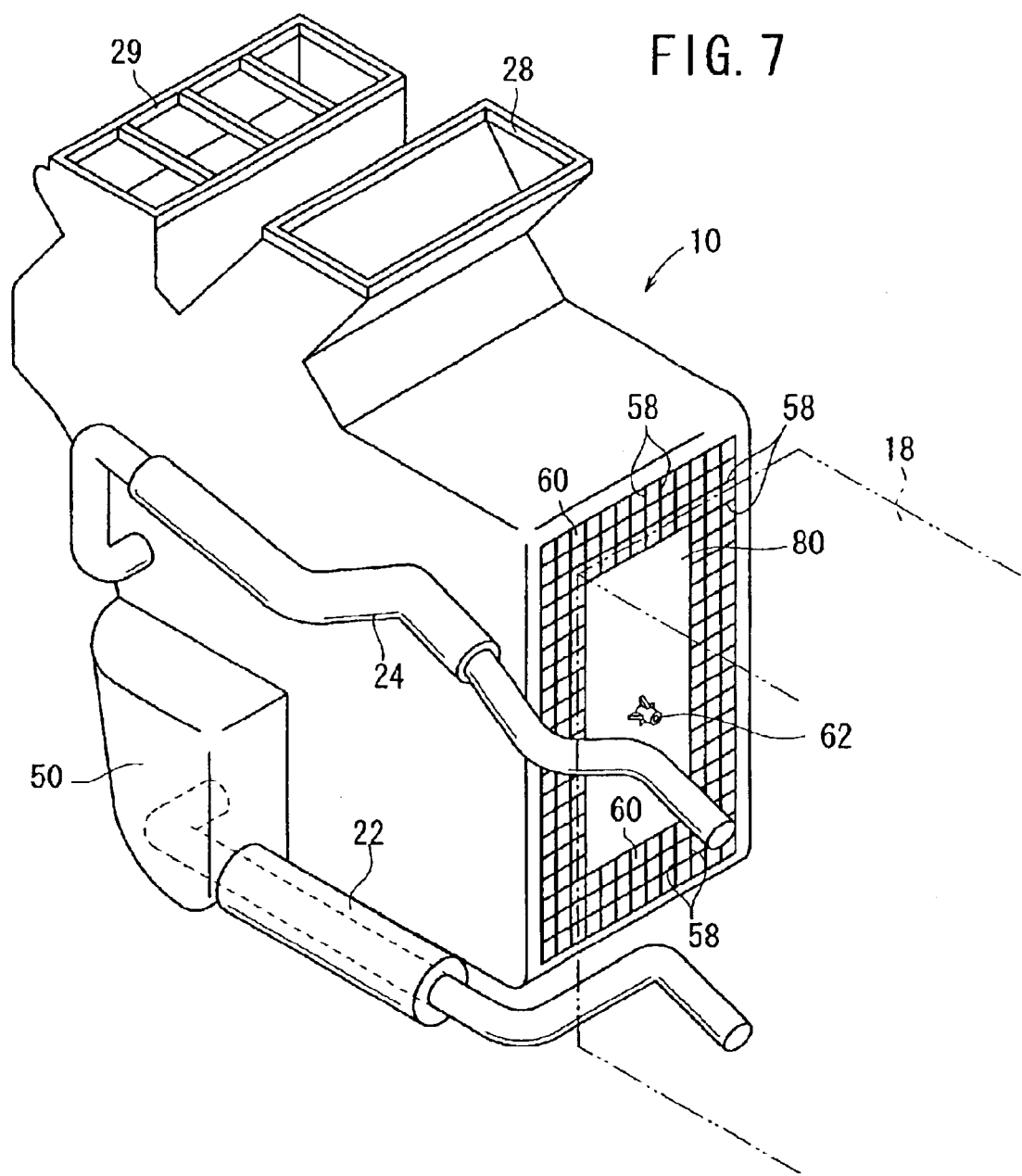
FIG. 7 is a perspective view of the vehicle air-conditioning system, viewed from a direction that is opposed to the direction from which the vehicle air-conditioning system is viewed in FIG. 2.

The grooves 58 and the protrusion 62 may be provided on the surface 80 of the vehicle air-conditioning system 10 near the engine 18 (see FIG. 7). Specifically, when the vehicle 12 collides with an obstacle positioned forwardly thereof, the engine compartment is compressed, pushing the engine 18 into contact with the vehicle air-conditioning system 10. Thus, the vehicle air-conditioning system 10 should preferably be broken because of the grooves 58 and the protrusion 62 that are provided on the surface of the vehicle air-conditioning system 10, which faces the engine 18. When the vehicle air-conditioning system 10 is thus broken, the shocks from the engine 18 can be absorbed.

The grooves 58 and the protrusion 62 may also be provided on another partition of the vehicle air-conditioning system 10.

Although certain preferred embodiments of the present invention have been shown and described in detail, it should be understood that various changes and modifications may be made therein without departing from the scope of the appended claims.

What is claimed is:

1. A partition in a vehicle, comprising:
   a collision surface for receiving shocks when a peripheral member impinges thereon, backside of said collision surface being a space;
   a thin-walled region surrounding said collision surface; and
   a protrusion disposed on said collision surface in a region which can possibly be hit by said peripheral member.

2. The partition according to claim 1, further comprising:
   a support contacting a side surface of said protrusion and said collision surface.

3. The partition according to claim 1, wherein said protrusion has a tubular shape.

4. The partition according to claim 1, wherein said thin-walled region comprises a plurality of intersecting grooves.

5. The partition according to claim 4, wherein said grooves are deeper in an area close to said protrusion than in other areas.

6. The partition according to claim 1, wherein a plurality of protrusions is disposed on said collision surface.

7. The partition according to claim 1, wherein said peripheral member comprises an engine, said thin-walled region and said protrusion being positioned near said engine.

8. The partition according to claim 1, wherein said collision surface is a wall having an air passage in a vehicle air-conditioning system.

9. The partition according to claim 1, wherein said collision surface has a seam and is divided by the seam into a pair of collision surfaces, each of said collision surfaces having said protrusion.

10. The partition according to claim 9, wherein said protrusion has a greater height from said collision surface than said seam.

11. The partition according to claim 1, wherein said protrusion has a flat upper surface.

* * * * *